May 4, 1926.

H. F. WILLKIE

PURIFICATION OF PROPYL ALCOHOLS

Filed Nov. 4, 1921

Inventor
Herman F. Willkie
By his Attorneys
Prindle, Wright, & Small.

Patented May 4, 1926.

1,583,328

UNITED STATES PATENT OFFICE.

HERMAN F. WILLKIE, OF BALTIMORE, MARYLAND, ASSIGNOR TO U. S. INDUSTRIAL ALCOHOL CO., INC., A CORPORATION OF WEST VIRGINIA.

PURIFICATION OF PROPYL ALCOHOLS.

Application filed November 4, 1921. Serial No. 512,764.

*To all whom it may concern:*

Be it known that I, HERMAN F. WILLKIE, a citizen of the United States, a resident of Baltimore, Maryland, have invented a certain new and useful Purification of Propyl Alcohols, of which the following is a specification.

This invention relates to a process of purifying propyl and isopropyl alcohols.

This invention has as an object the purification of propyl and isopropyl alcohols to render them free from various impurities such as gaseous and other hydrocarbons, sulphur compounds, excess water, etc. It has as a further object the purification of said alcohols by processes which can be operated on a large commercial scale in a thoroughly efficient manner.

Various forms of apparatus may be designed to carry out the processes of this invention, but for the sake of a specific embodiment the following two preferred forms will be described.

Figure 1:
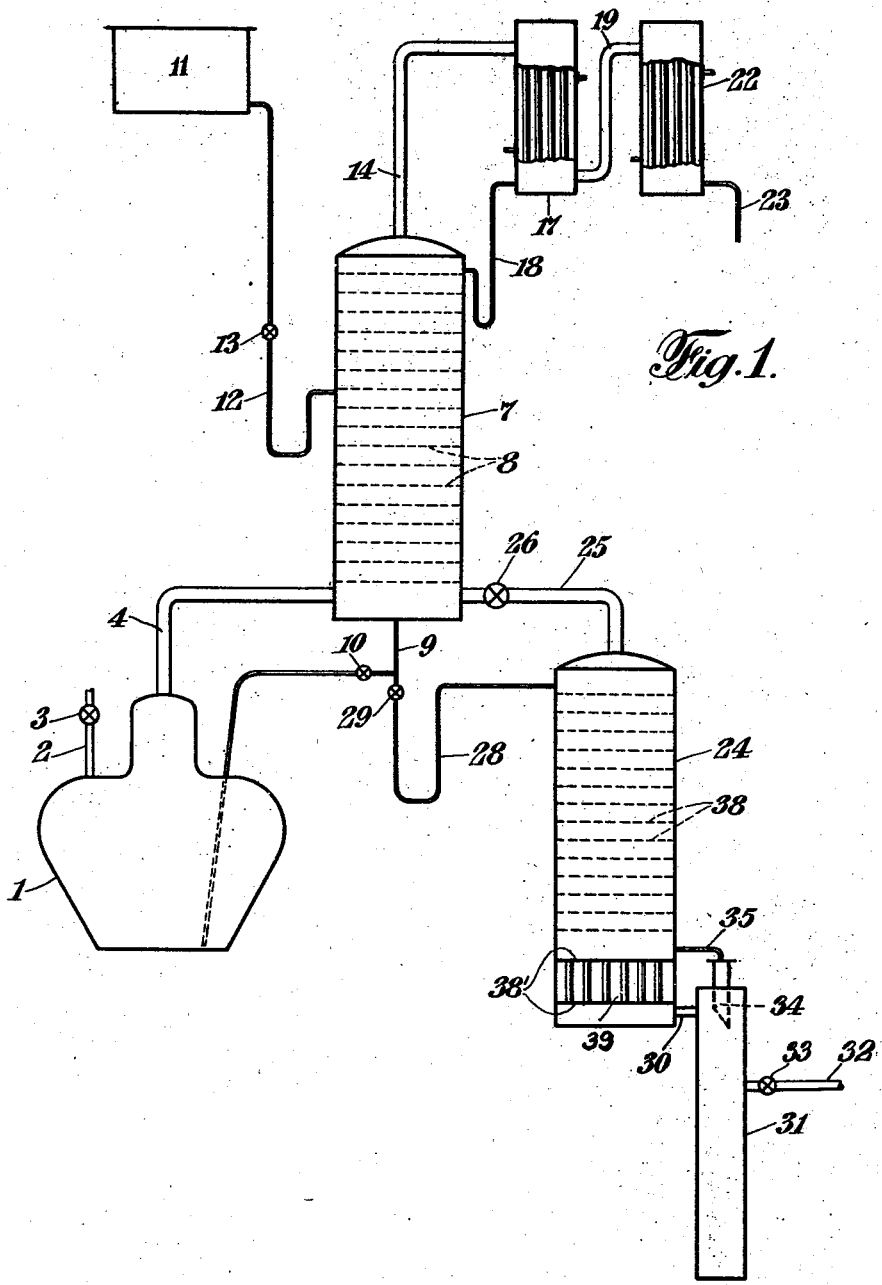
Figure 1 shows an elevation more or less diagrammatic of an apparatus designed to purify propyl and isopropyl alcohols on a commercial scale.

Considering first Fig. 1, there is shown a still 1 provided with inlet pipe 2 having a valve 3 and also provided with a vapor outlet pipe 4 for admitting the vapors to the washing column 7. The latter is provided with rectifying sections or plates 8 and has a return flow pipe 9 provided with a valve 10 leading back to the still 1. A permanganate container 11 is utilized to deliver permanganate solution to the column 7 through a pipe 12 provided with a valve 13. Leading from the column is a vapor pipe 14 leading to a dephlegmator 17 having a return pipe 18 leading back to the top of the column 7. A pipe 19 leads to a condenser 22, from which a pipe 23 conducts condensed liquid to any suitable receiver.

An exhausting column 24 connects with the column 7 through a pipe 25 provided with a valve 26 and receives liquid from the column 7 through a pipe 28 provided with a valve 29. At the bottom of the column 24 a pipe 30 conducts waste liquid into an overflow 31. A pipe 32 having a valve 33 connects to the overflow 31 and a vapor return pipe 34 connects to the bottom of the column through a smaller pipe 35.

The column 24 is provided with rectifying sections or plates 38 as in the case of the column 7 and there are two plates 38' at the bottom of the column between which there is a steam heating section 39.

Figure 2:
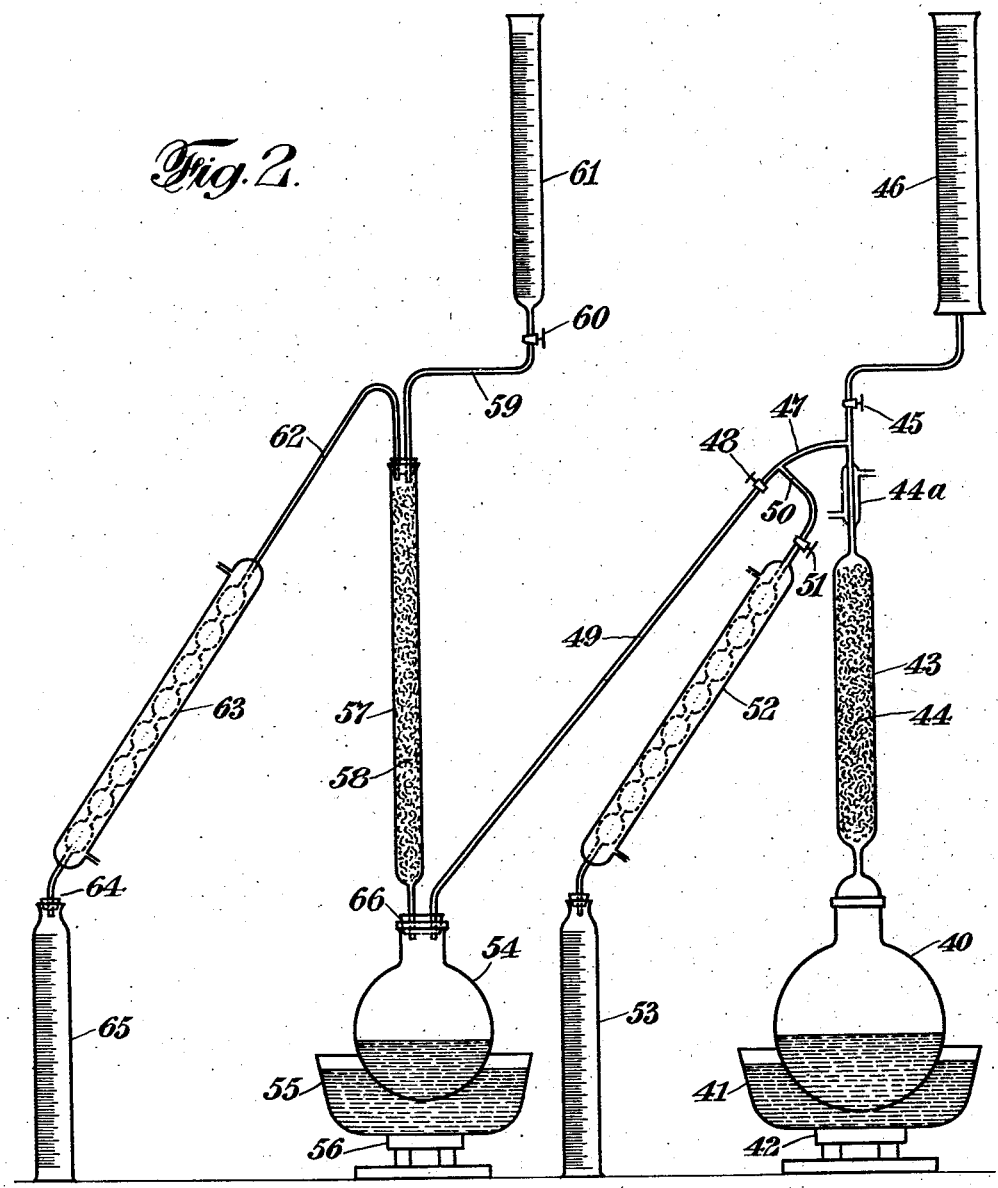
Figure 2 illustrates an apparatus designed for the purification of propyl and isopropyl alcohols on a smaller or laboratory scale.

Fig. 2 will now be described. There is shown a flask 40 positioned in a dish 41 containing a liquid bath heated by an electric hot plate 42 and a vertical rectifier 43, containing fragments of suitable inert material 44 and carrying at its upper end a reflux condenser 44ª, is fitted into the top of the flask for rectifying vapors evolved from the flask. A graduated vessel 46 supplies the column 43 with liquid, which is regulated by stop cock 45. A tube 47 provided with a valve 48 leads through an inclined tube 49 into a second flask 54, there being a by-pass 50 provided with a valve 51 leading into a condenser 52 provided with a receiver 53. The flask 54 is heated by a liquid bath 55 on a hot plate 56. A rectifying column 57 provided with fragments of inert material 58 is inserted in the top of the flask 54 and a vessel 61 feeds liquid to said column through a pipe 59 provided with a valve 60. From the column a tube 62 leads downwardly to a condenser 63 connected through a cork 64 to a receiver 65. The cork or stopper 64 may be of any suitable material such as cork or rubber, covered if desired with tin foil, and similar stoppers may be provided for flask 54 such as a stopper 66.

The operation of the apparatus shown in Fig. 1 will now be described. A quantity of impure commercial isopropyl alcohol is mixed with about half its volume of 2% potassium permanganate solution and run into the still 1, whence the alcohol is distilled through the pipe 4 into the column 7 down which is made to flow a .04% neutral potassium permanganate solution from the tank 11. The first 10% and the last 10% of the alcohol distillate are collected separately from the middle 80%. In obtaining this middle 80% portion, the still is operated while the valves 26 and 29 are closed until the first 10% of the distillate has been removed by condensation in the condenser 22, after which said valves are opened and the valve 10 closed in order to allow the permanganate to flow down the column into the pipe 9 and the pipe 28 and thence into the column 24, where the alcohol is distilled off from the permanganate solution and passes by way of the pipe 25 through the column 7 to the condensing apparatus. This operation is continued until only 10% of the alcohol is left in the still, when the valves 26 and 29 are again closed, the valve 10 is opened, and the last 10% is thereafter collected separately. The middle 80% of isopropyl alcohol thus prepared is a clean neutral-smelling alcohol free from all objectionable odors.

The first and last portions of the distillate, that is, the two 10% portions, are further purified in order to recover pure isopropyl alcohol. The method of purification is as follows:—

The impure alcohol is mixed with an equal volume of 10% $H_2SO_4$ and distilled. The first 10% of the last 10% of the distillate are collected separately and the middle portion is then treated as in the above described process. Similarly any other impure fractions may be subject to a preliminary sulphuric acid treatment prior to admixture with permanganate solution, according to the above described process carried out in the apparatus of Fig. 1.

If it is still desired to remove some of the remaining water in the isophopyl alcohol, this may be done by adding a small amount of solid caustic soda to form an aqueous solution. It is, however, necessary to distill the alcohol in order to separate it from the small amount of sodium hydroxide that dissolves in the alcohol itself, and in view of this fact it is more economical to remove practically all the water from a portion of the alcohol, and then mix the necessary quantity of this dried alcohol with the wet in order to bring the resulting mixture to the required density. The distillation of the alcohol should be carried out in a still without a rectifying column. While the above method is described, any other method can of course be employed.

If the crude alcohol contains any considerable quantities of hydrocarbons, it is advisable to first remove a large portion of these impurities by distillation. Such portion may amount to as large as 25% where the hydrocarbon impurities are present in large quantities. It is also advantageous in the case of very impure propyl alcohols to begin the treatment with sulphuric acid and then treat with permanganate solution since the acid removes any organic bases and other impurities. In such a case, the alcohol may be mixed with an equal volume of 25% sulphuric acid and distilled, the distillate being treated with the permanganate as in the above described embodiment of the process. The proportion of acid may vary considerably with respect to the alcohol. For example, one part of dilute acid may be used to treat as large as 4 parts of the alcohol, the concentration of the acid varying from 1 part concentrated sulphuric acid in 4 of water to one part in 20. The proportions of acid to alcohol will of course have to be determined according to the percentage of the impurities in the crude alcohol. The permanganate is preferably neutral and may be used in dilute or concentrated form. For example, from .02% potassium permanganate to concentrated potassium permanganate may be used. The permanganates of other metals such as sodium or calcium may be employed. Potassium permanganate is preferred as an oxidizing agent, but other suitable oxidizing agents may also be used such as chromates and peroxides. The sulphuric acid may also be replaced by any other acid suitable for eliminatiing organic bases and other impurities, such as phosphoric acid, oxalic acid and tartaric acid.

The operation of the apparatus shown in Fig. 2 will now be briefly described. The impure alcohol is placed in the flask 40 together with sulphuric acid to treat the alcohol in the form of a liquid or the sulphuric acid may be fed through the vessel 46 to treat the alcohol in the form of a vapor suitably diluted and distilled through the column 43, the first 10% being run through the pipe 50 the valve 48 being closed and condensed in the condenser 52. The valve 48 is then opened and the stop cock 51 is closed to allow the vapors to pass through the pipe 49 and to the flask 54 which serves to condense certain impurities having a higher boiling point than that of the alcohol, and from the flask 54 the vapors ascend into the column 57 wherein they are washed with a dilute permanganate solution issuing from the vessel 61. The purified alcohol vapors pass from the pipe 62 and are condensed in the condenser 63, from which they are collected in the receiver 65. The strengths of the acid and permanganate solutions have already been described above. The flask 54 is maintained at a temperature slightly higher than the boiling point of the alcohol.

By the above described processes normal and isopropyl alcohol may be purified in an effective and economical manner and on a large commercial scale if so desired. The alcohols obtained are free from foreign odors and are quite pure, although they generally contain small amounts of water. The latter may, however, as above stated, be entirely removed if so desired.

As many apparently widely different embodiments of this invention may be made without departing from the spirit thereof, it is to be understood that I do not intend to limit myself to the specific embodiment thereof except as indicated in the appended claims.

I claim:

1. The process of purifying a propyl alcohol comprising distilling it from a mixture with an oxidizing agent and treating the vapor with an oxidizing agent, and removing the first and last impure portions of the distillate.

2. The process of purifying a propyl alcohol comprising treating it in the form of a vapor with an oxidizing agent, and then treating the impure portions of the distillate with an acid substantially non-volatile at the boiling point of the alcohol.

3. The process of purifying a propyl alcohol comprising treating it with an oxidizing solution, distilling the alcohol therefrom, and separately collecting the first and last portions of the distillate and treating them with an oxidizing agent and an acid substantially non-volatile at the boiling point of the alcohol.

4. The process of purifying a propyl alcohol comprising treating it with an oxidizing solution, distilling the alcohol therefrom, collecting the first and last portions of the distillate separately and treating them with an acid substantially non-volatile at the boiling point of the alcohol, and with a permanganate solution.

5. The process of purifying a propyl alcohol comprising treating it with an oxidizing solution, distilling the alcohol therefrom, collecting the first and last portions separately and distilling them with dilute sulphuric acid, and treating the distillate with permanganate solution to purify it.

6. The process of purifying a propyl alcohol comprising treating it with a permanganate solution, distilling the alcohol therefrom, collecting the first and last portions of the distillate separately, distilling them with dilute sulphuric acid, treating the distillate vapors with permanganate solution to purify them, and collecting the first and last portions of the distillate separately from the main portion of purified alcohol.

7. The process of purifying a propyl alcohol comprising treating it in the vapor phase with permanganate solution, and distilling the alcohol therefrom.

8. The process of purifying a propyl alcohol comprising treating it with a permanganate solution, distilling the alcohol therefrom, collecting the first and last portions of the distillate separately, and treating said portions with dilute sulphuric acid and permanganate solution.

9. The process of purifying a propyl alcohol comprising treating it with dilute sulphuric acid, distilling the alcohol therefrom, and treating the distillate with a permanganate solution.

10. The process of purifying a propyl alcohol comprising treating it with dilute sulphuric acid, distilling the alcohol therefrom, treating the distillate with permanganate solution, distilling the alcohol from the latter, and collecting the first and last portions of the distillate separately.

11. The process of purifying a propyl alcohol comprising distilling it and treating the vapor with an oxidizing agent, separately collecting the first and last portions of the distillate and treating them with an acid substantially non-volatile at the boiling point of the alcohol and with an oxidizing agent.

12. The process of purifying a propyl alcohol comprising treating it with a permanganate solution, distilling the alcohol therefrom and passing the vapors through a permanganate solution, separately collecting the first and last portions of the distillate, and distilling them with dilute sulphuric acid and treating the distillate with a permanganate solution to purify it.

13. The process of purifying isopropyl alcohol comprising treating it with an oxidizing solution, distilling the alcohol therefrom, collecting the first and last portions separately, distilling them with dilute sulphuric acid, and treating the distillate with permanganate solution to purify it.

14. The process of purifying isopropyl alcohol comprising treating it with a permanganate solution, distilling the alcohol therefrom, collecting the first and last portions of the distillate separately, distilling them with dilute sulphuric acid, treating the distillate vapors with permanganate solution to purify them, and collecting the first and last portions of the distillate separately from the main portion of purified alcohol.

15. The process of purifying a propyl alcohol comprising treating it in vapor form with a permanganate solution.

16. The process of purifying a propyl alcohol comprising distilling it and treating the vapor with an oxidizing agent, and treating the first and last portions of the distillate with sulphuric acid and with an oxidizing agent.

17. The process of purifying a propyl alcohol comprising treating it with an acid substantially non-volatile at the boiling point of the alcohol, distilling the alcohol and treating the vapor with an oxidizing agent, separately collecting the first and last portions of the distillate and treating them with an acid substantially non-volatile at the boiling point of the alcohol and with an oxidizing agent.

18. The process of purifying a propyl alcohol comprising treating it with sulphuric acid having a strength of about 25%, distilling the alcohol and passing the vapor in contact with an oxidizing solution, separately collecting the first and last portions of the distillate and distilling them from sulphuric acid, and passing the vapors of the latter distillate through an oxiding solution.

In testimony that I claim the foregoing, I have hereunto set my hand this 28 day of October, 1921.

HERMAN F. WILLKIE.